Figure 1:
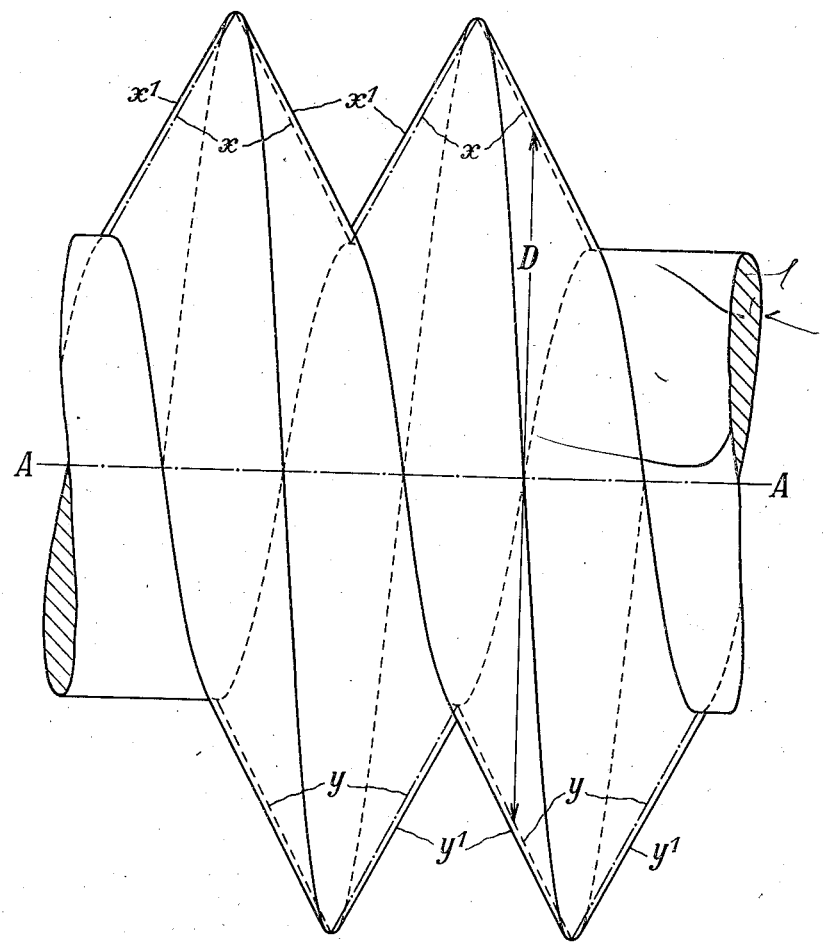

July 17, 1923.

F. MEYER 1,461,782

APPARATUS FOR TESTING BOLT THREADS

Filed Aug. 8, 1921

2 Sheets-Sheet 1

July 17, 1923.  1,461,782
F. MEYER
APPARATUS FOR TESTING BOLT THREADS
Filed Aug. 8, 1921   2 Sheets-Sheet 2
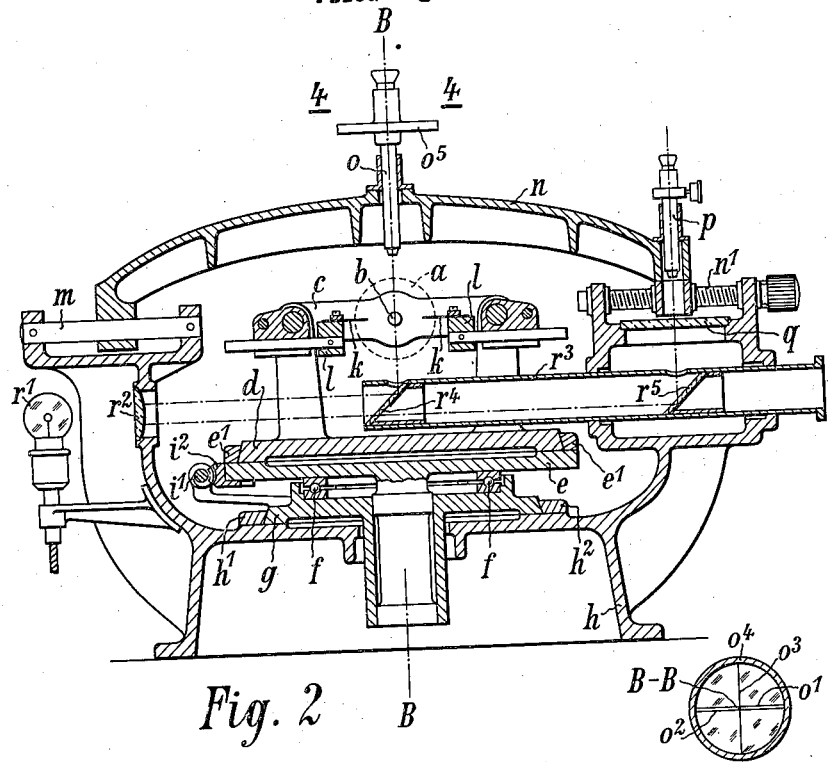
Fig. 2
Fig. 4
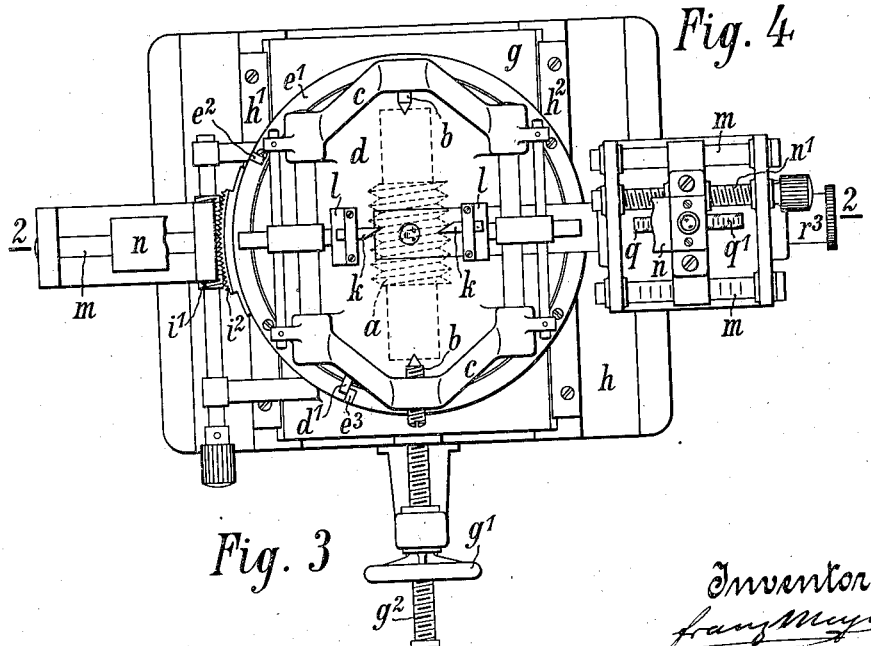
Fig. 3
Inventor:
Franz Meyer Patented July 17, 1923.

1,461,782

UNITED STATES PATENT OFFICE.

FRANZ MEYER, OF JENA, GERMANY, ASSIGNOR TO THE FIRM OF CARL ZEISS, OF JENA, GERMANY.

APPARATUS FOR TESTING BOLT THREADS.

Application filed August 8, 1921. Serial No. 490,736.

*To all whom it may concern:*

Be it known that I, FRANZ MEYER, a citizen of the German Empire, and residing at Jena, Germany, have invented a new and useful Apparatus for Testing Bolt Threads (for which I have filed an application in Germany, October 29, 1919; Switzerland, October 9, 1920; England, October 13, 1920, Patent No. 153,296; and France, October 28, 1920), of which the following is a specification.

The present invention relates to an apparatus for testing bolt threads, which is fitted with a microscope containing in its image field a linear mark rotatable about the axis of the microscope, and in which the screw bolt and the microscope are displaceable relatively to each other in a plane perpendicular to the axis of the microscope. In the annexed drawing Fig. 1 shows on a very large scale a bolt thread with a few characterizing lines, Figs. 2 to 4 illustrate a constructional example of the invention. Fig. 2 is a vertical section of the apparatus, Fig. 3 a plan of the same and Fig. 4 a section on an enlarged scale of the image plane of the testing microscope.

With apparatus of this kind used hitherto the method of testing a screw is as follows. In order, for instance, to measure the flank diameter of the screw, the mark in the microscope is first of all brought into coincidence with the contour of one flank, the microscope and the screw being thereupon displaced relatively to one another perpendicularly to the axis of the screw, until the linear mark coincides with the flank contour opposite to the first contour. The flank diameter is then the amount, by which the linear mark in the microscope and the screw have been displaced relatively to one another perpendicularly to the axis of the screw. On careful consideration it cannot be asserted, however, as regards the distance so measured, that it represents the actual flank diameter, and certainly not with that accuracy, which should be required, when measuring with an apparatus of the kind under consideration, with which a high degree of accuracy in reading may be obtained. The flank diameter of a screw is the term generally applied to the distance apart, measured perpendicularly to the axis of the screw, of two straight lines, in which a plane passing through the axis of the screw intersects two adjacent flanks of the thread on two oppositely located sides of the screw. By way of example, in the case of the screw shown in Fig. 1 of the drawing, the top and bottom of the thread of which is cut perfectly sharply, the relative distance D, measured perpendicularly to the axis A—A of the two lines $x$ and $y$, which are the lines of intersection of the screw with a plane, which contains the axis A—A of the latter and is parallel to the plane of the drawing, represents the flank diameter. The lines $x$ and $y$ are, however, in general not at the same time the contour lines of the screw. If the screw be shown for instance in vertical projection in the plane of the drawing, the lines $x^1$ and $y^1$ are obtained as the contour and, as is obvious from the drawing, a great error will be made, if the relative distance of the lines $x^1$ and $y^1$, measured perpendicularly to the axis A—A, be taken as being equal to the flank diameter. If the bounding lines of the screw be examined one after the other through a microscope, the axis of which is perpendicular to the plane of the drawing, the contour lines seen deviate more or less, on account of the finite aperture of the microscope objective, from the vertical projection, but may just by chance coincide with the lines of intersection $x$ and $y$. Thus, while the diameter determined by the microscope may come nearer to the true flank diameter than that determined from the vertical projection still it can never be determined, to what extent such an approximation takes place. The same holds good as regards the other quantities to be determined from the course of the flanks of the thread, viz as regards the flank angle and the pitch of the screw.

According to the invention it is possible to be entirely independent of the contour lines of the screw and to measure the above mentioned quantities accurately, if the measuring apparatus of the kind in question be fitted with two knife-edges, which can be laid independently of one another in the plane containing the axis of the screw bolt and perpendicular to the axis of the microscope against two thread flanks of the bolt. If such a knife-edge, which must of course be ground particularly finely and so as to run in a perfectly straight line, be laid against a flank of the thread, an exceedingly fine gap will exist between the knife-edge and the flank, if the knife-edge be laid against the flank without being directly pressed against the latter. If the flank be examined through a microscope having a sufficiently large aperture, this gap will appear provided that suitable illumination be employed, even when the line on the flank, with which the light gap coincides, is invisible in the vertical projection of the screw. On two knife-edges being laid against two oppositely located flanks in a plane containing the axis of the screw bolt and directed perpendicularly to the axis of the microscope, then the two light gaps characterize the lines of intersection of the said plane with the two flanks and their relative distance measured perpendicularly to the axis of the screw is the actual flank diameter of the screw. By laying the two knife-edges against two flanks, which are adjacent to each other, and using, for instance, the rotatable linear mark provided in the image plane of the microscope, the flank angle may be determined, and by laying them against two flanks running parallel to one another on the same side of the axis of the bolt, and displacing the bolt and the microscope relatively to one another in the direction of the axis of the bolt, the pitch of the screw may be determined.

Apparatus for testing the threads of bolts by means of light gaps are already known. In these known apparatus a gauge corresponding to the particular kind of thread is introduced between two adjacent flanks of the threaded bolt and, by looking through between the gauge and the flanks, a test is made, as to whether the flank angle coincides with the angle of the gauge. Hence the light gaps in this case do not serve, as in the case of the apparatus according to the invention, to fix certain definite lines on the flanks of the thread and thereupon to use these lines for accurate measurements. Actual measurements cannot be carried out with these known apparatus. If the flank angle of the particular screw should not agree with the angle of the gauge, the amount by which they differ cannot be ascertained with these apparatus. But even should no more be required than to ascertain, that the flank angle and the gauge agree with each other or differ from each other, still with these known apparatus a separate gauge is required for each kind of thread, while with an apparatus according to the invention two knife-edges are sufficient for all threads, each of which need only be fitted with a single rectilinear edge.

The threaded bolts $a$ to be tested is supported between the two centers $b$ of a support $c$, which is fixed on a circular plate $d$, which itself rests on a plate $e$ and is rotatable in an annular guide $e^1$. This latter plate is mounted so as to be rotatable about the same axis as the former one by means of balls $f$ on a slide $g$, which is displaceable between guides $b^1$ and $b^2$ perpendicular to the plane of the drawing (as seen in Fig. 2) and rests on the bed plate $h$ of the apparatus. A screw $i^1$ journalled on the slide $g$ serves for turning the plate $e$, which screw engages in a worm wheel segment $i^2$ fixed to the plate $e$. On the annular guide $e^1$ two stops $e^2$ and $e^3$ are provided for a projection $d^1$ fixed on the plate $d$, these stops being so positioned that the plate $d$ can be turned through an angle of exactly 90° relatively to the plate $e$. A handwheel $g^1$ serves for displacing the slide $g$. This handwheel is formed as a screw nut, is journalled on the bed-plate $h$ and co-acts with a screw $g^2$ fixed to the slide $g$. The support $c$ serving for holding the screw bolt $a$ to be tested also carries two knife-edges $k$, each of which is clamped in a holder $l$ which is displaceable both perpendicular to the axial direction of the centers $b$ and parallel to the said direction. Above the knife edges $k$ and at right angles to the axis of the centres $b$ a bridge $n$ is mounted, which is displaceable on three cylindrical bars $m$ carried by the bed-plate $h$ and supports in its middle a microscope $o$ and at one of its ends a microscope $p$. The microscope $o$, which is to act as the testing microscope, has in its image-plane two threads $o^1$ and $o^2$, which are stretched close together and parallel to each other, and a thread $o^3$ perpendicular to the other two threads. All the threads are rotatable together with a tube $o^4$ about the axis B—B of the microscope. The rotation of the tube $o^4$ and consequently of the threads as well can be read off from the position of an index connected with it relative to a graduated circle, which is marked on an extension $o^5$ of the microscope casing in such a manner that the index occupies the zero position, when the threads $o^1$ and $o^2$ are directed perpendicularly to the direction of displacement of the bridge $n$. The microscope $p$, which is to serve as a reading microscope for determining the amounts of lateral displacements of the bridge $n$, is fitted with an ocular micrometer, and below this microscope approximately in the plane of the knife-edges $k$, there is a scale $q^1$ marked on a glass-plate $q$. A screw $n^1$ serves for displacing the bridge $n$. There is further provided an illuminating device consisting of an incandescent lamp $r^1$, a collective lens $r^2$ and two reflectors $r^4$ and $r^5$ fixed in a tube $r^3$ adapted to be displaced in its longitudinal direction, the relative distance of the reflectors being the same as the distance between the microscopes. The reflector $r^4$, by means of which the light is to be deflected to the knife-edges $k$, is nontransparent in its upper part, while the foiling is removed in the lower part, so that the light can pass through this part to the reflector $r^5$ lying behind it, from whence it is thrown onto the scale $q^1$.

When the thread of a bolt is to be tested with the apparatus just described, the following procedure is adopted. The bolt having been clamped between the centres $b$ and the projection $d^1$ brought in contact with the stop $e^3$, the bolt is in the first place adjusted by turning the screw $i^1$ in such a manner that its axis is exactly perpendicular to the direction of motion of the bridge $n$ and consequently of the microscopes. Thereupon, for determining the flank diameter of the threaded bolt, the knife-edges $k$ are laid, as shown, opposite to each other against two adjacent flanks in such a manner that, the illuminating device being suitably set, the light gaps between the knife-edges $k$ and the flanks of the thread, when viewed through the microscope $o$, appear as two fine, uniformly wide bright lines. By displacing the bridge $n$ and turning the threads of the microscope $o$, the image of one of the light gaps, formed by the objective of this microscope, is then brought between the two parallel threads $o^1$ and $o^2$ and the position of the optical axis of the microscope $p$ relative to the scale $q^1$ is read off by means of the ocular micrometer of the latter microscope. The microscope $o$ is thereupon set by displacing the bridge $n$ perpendicularly to the axis of the screw to the second light gap, it being assumed, that the two light gaps are parallel to one another, as should be the case with a good screw, and the position of the optical axis of the microscope $p$ relative to the scale $q^1$ is again read off. The difference between the two readings represents the flank diameter. For determining the angle contained by a flank and the axis of the threaded bolt, one knife-edge is laid against the flank in question and the image of the light gap, formed by the objective of the microscope $o$ is again brought between the threads $o^1$ and $o^2$ and the position of the index connected with the tube $o^4$ relative to the graduated circle on the extension $o^5$ is read off. Finally, for measuring the pitch, two knife-edges are laid against two thread flanks, which are parallel to one another, on the same side of the axis of the threaded bolt $a$ and, after the tube $r^3$ has been drawn sufficiently far to the right, the plate $d$ is turned out of the position shown in the drawing, until the projection $d^1$ touches the stop $e^2$, i. e. through exactly 90°, so that the axis of the threaded bolt coincides with the direction of displacement of the bridge $n$. Then after the bolt $a$ has been brought by means of the hand-wheel $q^1$ into the required position relative to the bridge $n$ and the tube $r^3$ with the reflectors $r^4$ and $r^5$ has again been given the required position, the relative distance of the two light gaps may be determined by means of the scale $q^1$ and the ocular micrometer of the microscope $p$, and the said distance and the number of threads lying between the light gaps gives the pitch.

I claim:

In an apparatus for testing bolt threads a microscope, containing in the focal plane of its ocular a linear mark rotatable about the axis of the microscope, means for supporting the screw bolt with relation to the microscope, other means for displacing the screw bolt and the said microscope relatively to each other in a plane perpendicular to the axis of the said microscope, two knife-edges and means for supporting the said knife-edges with relation to the said bolt, these means being adapted to hold the knife-edges independently of each other in the plane containing the bolt axis and perpendicular to the microscope axis against two thread flanks of the bolt.

FRANZ MEYER.

Witnesses:
PAUL KRÜGER,
FRITZ LANDER.